US012046089B2

(12) United States Patent
Sugiura et al.

(10) Patent No.: US 12,046,089 B2
(45) Date of Patent: Jul. 23, 2024

(54) INFORMATION PROCESSING DEVICE, INFORMATION PROCESSING METHOD AND INFORMATION PROCESSING PROGRAM

(71) Applicant: TOYOTA JIDOSHA KABUSHIKI KAISHA, Aichi-ken (JP)

(72) Inventors: Chisato Sugiura, Toyota (JP); Ai Ito, Nagoya (JP); Akihito Nakamura, Toyota (JP); Yasuyuki Kamezaki, Toyota (JP); Takaaki Nagatani, Okazaki (JP); Shuhei Manabe, Toyota (JP); Masato Endo, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 303 days.

(21) Appl. No.: 17/751,550

(22) Filed: May 23, 2022

(65) Prior Publication Data

US 2022/0406105 A1 Dec. 22, 2022

(30) Foreign Application Priority Data

Jun. 22, 2021 (JP) ................................. 2021-103404

(51) Int. Cl.
*G07C 5/08* (2006.01)

(52) U.S. Cl.
CPC ......... *G07C 5/0825* (2013.01); *G07C 5/0841* (2013.01)

(58) Field of Classification Search
None
See application file for complete search history.

(56) References Cited

U.S. PATENT DOCUMENTS

2016/0288797 A1 10/2016 Takahashi et al.

FOREIGN PATENT DOCUMENTS

| | | | | | |
|---|---|---|---|---|---|
| JP | 201038645 | A | | 2/2010 | |
| JP | 2010-231776 | A | | 10/2010 | |
| JP | 201431050 | A | | 2/2014 | |
| JP | 2016197308 | A | | 11/2016 | |
| JP | 6763977 | B2 | * | 9/2020 | ........ B60W 60/0015 |
| JP | 7120048 | B2 | * | 8/2022 | |
| JP | 7188389 | B2 | * | 12/2022 | ............. G06Q 40/08 |

* cited by examiner

*Primary Examiner* — Khoi H Tran
*Assistant Examiner* — Bryant Tang
(74) *Attorney, Agent, or Firm* — HAUPTMAN HAM, LLP

(57) ABSTRACT

An information processing device includes: a decision unit that decides upper limits of respective individual evaluation values for a plurality of calculation items such that a total of the upper limits is a previously determined value, the individual evaluation values being relevant to driving of a driver, the calculation items being calculation items for which the individual evaluation values are calculated; an acquisition unit that acquires vehicle information relevant to a vehicle; a calculation unit that calculates the respective individual evaluation values for the calculation items within the upper limits decided by the decision unit, based on the vehicle information acquired by the acquisition unit; and a control unit that displays, on a display unit, the respective individual evaluation values for the calculation items that are calculated by the calculation unit and a total evaluation value that is a total of the respective individual evaluation values for the calculation items.

9 Claims, 10 Drawing Sheets

INFORMATION PROCESSING DEVICE, INFORMATION PROCESSING METHOD AND INFORMATION PROCESSING PROGRAM

CROSS-REFERENCE TO RELATED APPLICATION

This application claims priority to Japanese Patent Application No. 2021-103404 filed on Jun. 22, 2021, incorporated herein by reference in its entirety.

BACKGROUND

1. Technical Field

The present disclosure relates to an information processing device, an information processing method and an information processing program.

2. Description of Related Art

Japanese Unexamined Patent Application Publication No. 2014-031050 (JP 2014-031050 A) discloses a driving skill diagnosis device that can provide a diagnosis result depending on a driving skill of a driver and that allows an efficient use of the diagnosis result.

SUMMARY

In the technology in JP 2014-031050 A, the above diagnosis result is merely displayed as a radar chart, and evaluation values (points) for diagnosis items are not displayed.

It is desirable to display evaluation values as a driving diagnosis result, for an easy comparison with driving diagnosis results of other persons. However, by merely displaying the total value of the evaluation values for the diagnosis items, it is difficult to grasp whether the diagnosis result for each diagnosis item is good or bad. Therefore, it is difficult to lead to an effective driving improvement, and there is room for improvement in the display method of the driving diagnosis result.

Hence, the present disclosure has an object to provide an information processing device, an information processing method and an information processing program that make is possible to grasp the relation between the evaluation values for the diagnosis items and the total value of the evaluation values for the diagnosis items, at first glance.

An information processing device according to a first aspect of the disclosure includes: a decision unit that decides upper limits of respective individual evaluation values for a plurality of calculation items such that a total of the upper limits of the respective individual evaluation values for the calculation items is a previously determined value, the individual evaluation values being relevant to driving of a driver, the calculation items being calculation items for which the individual evaluation values are calculated; an acquisition unit that acquires vehicle information relevant to a vehicle; a calculation unit that calculates the respective individual evaluation values for the calculation items within the upper limits of the individual evaluation values that are decided by the decision unit, based on the vehicle information acquired by the acquisition unit; and a control unit that displays, on a display unit, the respective individual evaluation values for the calculation items that are calculated by the calculation unit and a total evaluation value that is a total of the respective individual evaluation values for the calculation items.

In the information processing device according to the first aspect of the disclosure, the decision unit decides the upper limits of the respective individual evaluation values for the plurality of calculation items such that the total of the upper limits of the respective individual evaluation values for the calculation items is the previously determined value. Further, the acquisition unit acquires the vehicle information. Further, the calculation unit calculates the respective individual evaluation values for the calculation items within the upper limits of the individual evaluation values that are decided by the decision unit, based on the vehicle information acquired by the acquisition unit. Then, the control unit displays, on the display unit, the respective individual evaluation values for the calculation items that are calculated by the calculation unit and the total evaluation value that is the total of the respective individual evaluation values for the calculation items. Thereby, in the information processing device, by displaying the respective individual evaluation values for the calculation items and the total evaluation value, it is possible to grasp the relation between the evaluation values for the diagnosis items and the total value of the evaluation values for the diagnosis items, at first glance.

In an information processing device according to the first aspect of the disclosure, a plurality of constituent items constituting the calculation items may be provided, and the information processing device may include an assignment unit that assigns the constituent items such that the constituent items constitute the calculation items, based on a previously determined relation between the calculation items and the constituent items.

In the information processing device according to the first aspect of the disclosure, the plurality of constituent items constituting the calculation items is provided. The assignment unit assigns the constituent items such that the constituent items constitute the calculation items based on the previously determined relation between the calculation items and the constituent items. Thereby, in the information processing device, as the previously determined relation, for example, the calculation items are constituted by a plurality of constituent items having high relevance degrees, and therefore, it is possible to give unity to a plurality of constituent items constituting each calculation item.

An information processing device according to the first aspect of the disclosure, may include an acceptance unit that accepts a setting of the calculation items that are displayed on the display unit, from a previously determined user.

In the information processing device according to the first aspect of the disclosure, the acceptance unit accepts the setting of the calculation items that are displayed on the display unit, from the previously determined user. Thereby, in the information processing device, the driver can grasp calculation items on which the previously determined user places importance.

In an information processing device according to the first aspect of the disclosure, a plurality of constituent items constituting the calculation items may be provided, and when the control unit accepts a selection of specification information that specifies the calculation items displayed on the display unit, the control unit may switch a screen of the display unit and may display information relevant to the constituent items constituting the calculation items corresponding to the specification information for which the selection is accepted.

In the information processing device according to the first aspect of the disclosure, the plurality of constituent items constituting the calculation items is provided. When the control unit accepts the selection of the specification information displayed on the display unit, the control unit switches the screen of the display unit and displays the information relevant to the constituent items constituting the calculation items corresponding to the specification information for which the selection is accepted. Thereby, in the information processing device, it is possible to restrain the decrease in the visibility for the driver that looks at the display unit, compared to a case where the information relevant to the constituent items, the specification information, the individual evaluation values and the total evaluation value are displayed on an identical screen.

In an information processing device according to the first aspect of the disclosure, when it is necessary to encourage the driver to improve the driving based on the respective individual evaluation values for the calculation items that are calculated by the calculation unit, the control unit may display, on the display unit, information relevant to the driving for which it is necessary to encourage improvement, and when it is not necessary to encourage the driver to improve the driving based on the respective individual evaluation values for the calculation items that are calculated by the calculation unit, the control unit may display, on the display unit, information praising the driver.

In the information processing device according to the first aspect of the disclosure, when it is necessary to encourage the driver to improve the driving based on the respective individual evaluation values for the calculation items that are calculated by the calculation unit, the control unit displays, on the display unit, the information relevant to the driving for which it is necessary to encourage improvement. Further, when it is not necessary to encourage the driver to improve the driving based on the respective individual evaluation values for the calculation items that are calculated by the calculation unit, the control unit displays, on the display unit, the information praising the driver. Thereby, in the information processing device, it is possible to change information at which the driver looks, depending on whether it is necessary to encourage the driver to improve the driving.

In an information processing device according to the first aspect of the disclosure, the control unit may display display contents relevant to the calculation items, on the display unit, in manners that are different depending on the calculation items.

In the information processing device according to the first aspect of the disclosure, the control unit displays the display contents relevant to the calculation items, on the display unit, in manners that are different depending on the calculation items. Thereby, in the information processing device, the driver that looks at the display unit can easily grasp the respective display contents for the calculation items.

In an information processing device according to the first aspect of the disclosure, the control unit may display, in an adjacent manner on the display unit, specification information that specifies the calculation items corresponding to the individual evaluation values calculated by the calculation unit and information relevant to the calculation items.

In the information processing device according to the first aspect of the disclosure, the control unit displays, in an adjacent manner on the display unit, the specification information that specifies the calculation items corresponding to the individual evaluation values calculated by the calculation unit and the information relevant to the calculation items. Thereby, in the information processing device, for a predetermined calculation item, it is possible to display the relevant information such that the relevant information is adjacent to the specification information that specifies the calculation item, and for example, by displaying evaluation data such that the evaluation data is adjacent to the specification information, it is possible to easily grasp the reason why the individual evaluation value for the calculation item corresponding to the specification information is good or bad.

In an information processing method according to a second aspect of the disclosure, a computer executes a process including: deciding upper limits of respective individual evaluation values for a plurality of calculation items such that a total of the upper limits of the respective individual evaluation values for the calculation items is a previously determined value, the individual evaluation values being relevant to driving of a driver, the calculation items being calculation items for which the individual evaluation values are calculated; acquiring vehicle information relevant to a vehicle; calculating the respective individual evaluation values for the calculation items within the decided upper limits of the individual evaluation values, based on the acquired vehicle information; and displaying, on a display unit, the calculated respective individual evaluation values for the calculation items and a total evaluation value that is a total of the respective individual evaluation values for the calculation items.

An information processing program according to a third aspect of the disclosure causes a computer to execute a process including: deciding upper limits of respective individual evaluation values for a plurality of calculation items such that a total of the upper limits of the respective individual evaluation values for the calculation items is a previously determined value, the individual evaluation values being relevant to driving of a driver, the calculation items being calculation items for which the individual evaluation values are calculated; acquiring vehicle information relevant to a vehicle; calculating the respective individual evaluation values for the calculation items within the decided upper limits of the individual evaluation values, based on the acquired vehicle information; and displaying, on a display unit, the calculated respective individual evaluation values for the calculation items and a total evaluation value that is a total of the respective individual evaluation values for the calculation items.

As described above, in the information processing device, information processing method and information processing program according to the present disclosure, it is possible to grasp the relation between the evaluation values for the diagnosis items and the total value of the evaluation values for the diagnosis items, at first glance.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An information processing system 10 according to an embodiment will be described below. The information processing system 10 according to the embodiment is a system that displays a driving diagnosis result as an evaluation of a driving operation and others of a driver of a vehicle.

Figure 1:
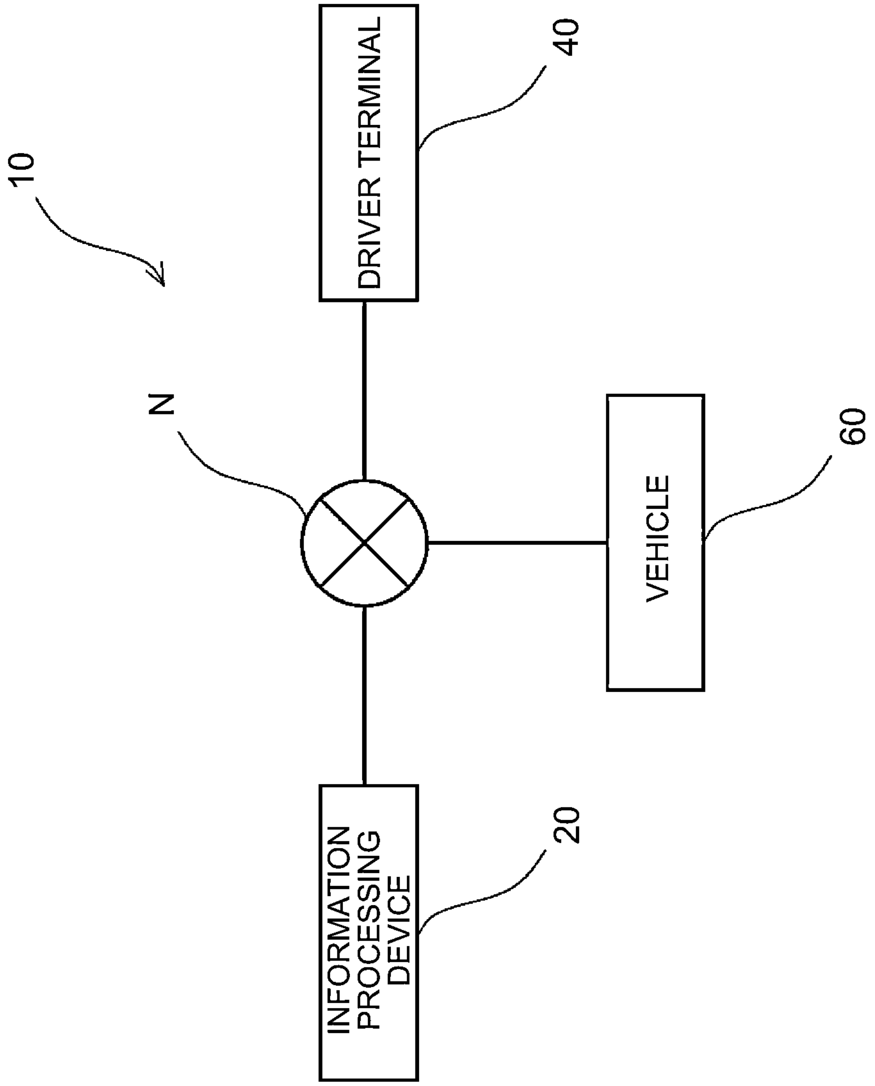
FIG. 1 is a diagram showing a schematic configuration of an information processing system according to an embodiment.

FIG. 1 is a diagram showing a schematic configuration of an information processing system 10. As shown in FIG. 1, the information processing system 10 includes an information processing device 20, a driver terminal 40 and a vehicle 60. The information processing device 20, the driver terminal 40 and the vehicle 60 are connected through a network N, and can communicate with each other.

The information processing device 20 is a server computer that is possessed by a predetermined business operator.

The driver terminal 40 is a portable terminal that is possessed by a driver of the vehicle 60. For example, a portable personal computer (notebook PC), a smartphone, a tablet terminal or the like is applied as the driver terminal 40. In the embodiment, as an example, the driver terminal 40 is a smartphone.

The vehicle 60 may be a gasoline vehicle, a hybrid electric vehicle or a battery electric vehicle. In the embodiment, as an example, the vehicle 60 is a gasoline vehicle.

Figure 2:
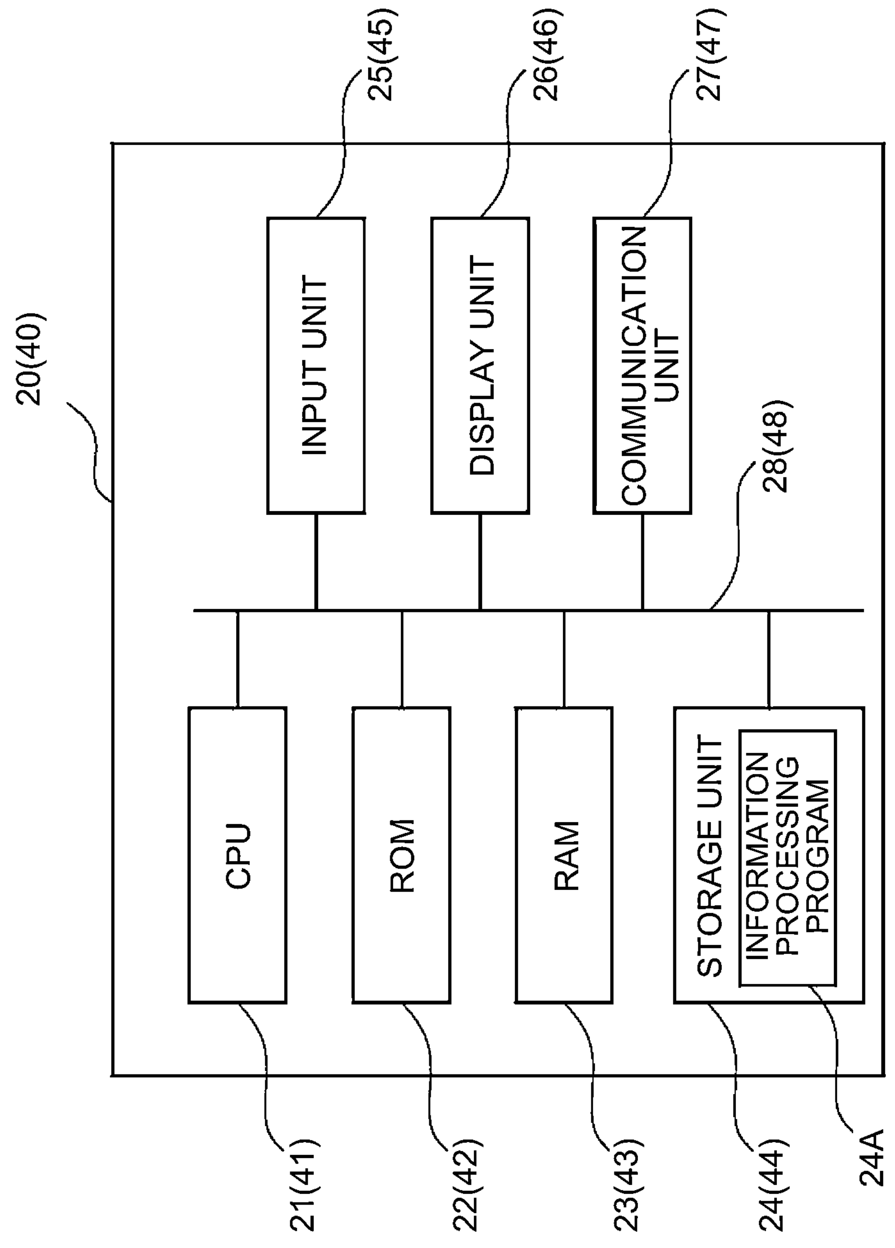
FIG. 2 is a block diagram showing a hardware configuration of an information processing device and a driver terminal according to the embodiment.

Next, a hardware configuration of the information processing device 20 and the driver terminal 40 will be described. FIG. 2 is a block diagram showing the hardware configuration of the information processing device 20 and the driver terminal 40. The information processing device 20 and the driver terminal 40 basically have a general computer configuration, and therefore, the information processing device 20 will be described as a representative.

As shown in FIG. 2, the information processing device 20 includes a central processing unit (CPU) 21, a read only memory (ROM) 22, a random access memory (RAM) 23, a storage unit 24, an input unit 25, a display unit 26 and a communication unit 27. The constituents are connected through a bus 28 in a mutually communicable manner.

The CPU 21, which is a central arithmetic processing unit, executes a variety of programs and controls the units. That is, the CPU 21 reads programs from the ROM 22 or the storage unit 24, and executes programs using the RAM 23 as a working area. The CPU 21 performs controls of the above constituents and a variety of arithmetic processes, in accordance with the programs recorded in the ROM 22 or the storage unit 24.

The ROM 22 contains a variety of programs and a variety of data. The RAM 23 temporarily stores programs or data, as a working area.

The storage unit 24 is constituted by a storage device such as a hard disk drive (HDD), a solid state drive (SSD) or a flash memory, and contains a variety of programs and a variety of data. In the embodiment, the storage unit 24 contains at least an information processing program 24A for executing a setting process and a display process described later.

The input unit 25 includes a pointing device such as a mouse, a keyboard, a microphone, a camera and the like, and is used for a variety of inputs.

For example, the display unit 26 is a liquid crystal display, and displays a variety of information. The display unit 26 may function as the input unit 25 by employing a touch panel technique.

The communication unit 27 is an interface for communicating with other devices. For the communication, for example, a wire communication standard such as Ethernet (R) or FDDI, or a wireless communication standard such as 4G, 5G or Wi-Fi (R) is used.

In the execution of the above information processing program 24A, the information processing device 20 executes processes based on the information processing program 24A, using the above hardware resources.

Figure 3:
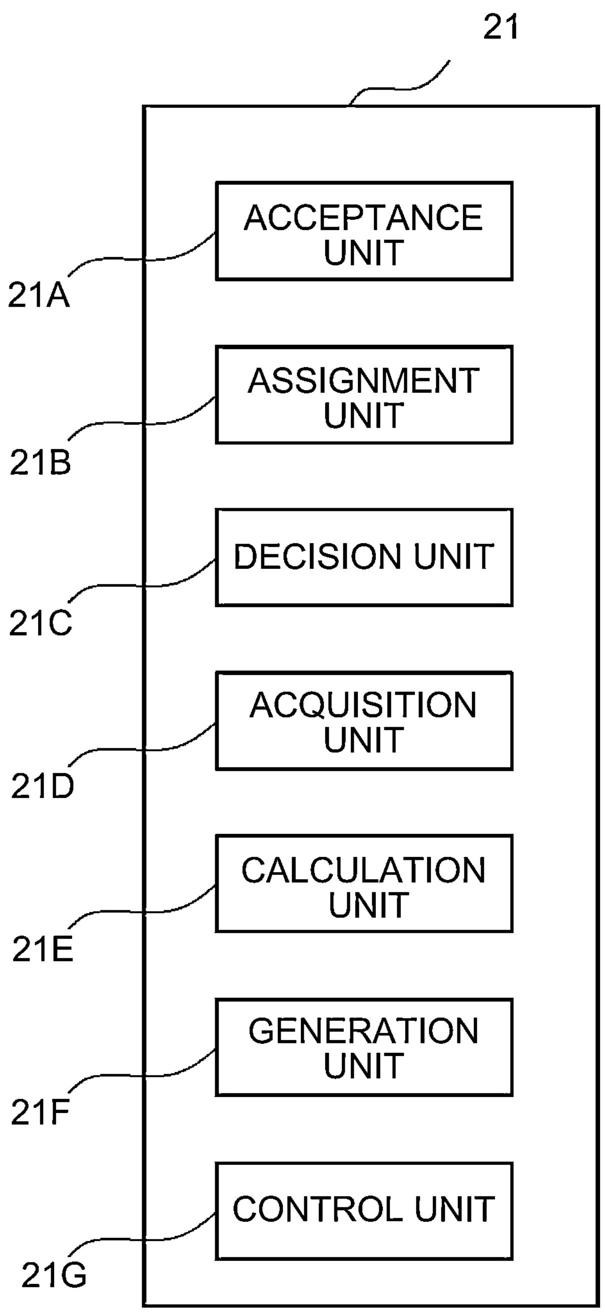
FIG. 3 is a block diagram showing an example of functional constituents of the information processing device according to the embodiment.

Next, functional constituents of the information processing device 20 will be described. FIG. 3 is a block diagram showing an example of the functional constituents of the information processing device 20 according to the embodiment.

As shown in FIG. 3, the CPU 21 of the information processing device 20 includes an acceptance unit 21A, an assignment unit 21B, a decision unit 21C, an acquisition unit 21D, a calculation unit 21E, a generation unit 21F and a control unit 21G, as functional constituents. Each functional constituent is realized when the CPU 21 reads and executes the information processing program 24A stored in the storage unit 24.

The acceptance unit 21A accepts a setting of calculation items that are displayed on the display unit 46 of the driver terminal 40 and for which individual evaluation values relevant to the driving of the driver are calculated, from a previously determined user. In the embodiment, the acceptance unit 21A accepts the setting of the calculation item from a predetermined business operator that possesses the information processing device 20, as the previously determined user. The display unit 46 of the driver terminal 40 is an example of the "display unit".

The assignment unit 21B assigns constituent items constituting the calculation items such that the constituent items constitute the calculation items, based on a previously determined relation between the calculation items and the constituent items.

Each of the calculation items is a diagnosis item that is relevant to the driving and for which an individual evaluation value to be presented to a driver is calculated. As an example, the calculation items include "accelerator", "steering", "brake", "ecology" and the like.

Each of the constituent items is an item showing a driving content that is used for the calculation of the individual evaluation value for the calculation item. As an example, the constituent items constituting the calculation item "brake" include items about brake operations such as sudden braking and temporary stop.

In the embodiment, a plurality of constituent items constituting the calculation items is provided, and a previously determined relation between the calculation items and the constituent items is prescribed. In the embodiment, the previously determined relation is "level of relevance degree". As an example, the relevance degrees of the calculation items with respect to the constituent items are previously prescribed by the predetermined business operator that possesses the information processing device 20, and a correspondence table showing the relevance degrees is stored in the storage unit 24. As an example, based on the above correspondence table, the assignment unit 21B assigns constituent items such that a calculation item for which the acceptance unit 21A has accepted the setting is constituted by the top five constituent items that have high relevance degrees with respect to the calculation item.

The decision unit 21C decides upper limits of respective individual evaluation values for a plurality of calculation items, such that the total of the upper limits of the respective individual evaluation values for the calculation items is a previously determined value. In the embodiment, as an example, the previously determined value is "100". The decision unit 21C divides the previously determined value "100" by the number of the calculation items for which the acceptance unit 21A has accepted the setting, and thereby decides the upper limits of the respective individual evaluation values for the calculation items.

The acquisition unit 21D acquires vehicle information relevant to the vehicle 60. For example, as the vehicle information, the acquisition unit 21D acquires the steering angle, acceleration, vehicle speed and blinker operation of the vehicle 60 that are detected by a steering angle sensor 71, an acceleration sensor 72, a vehicle speed sensor 73 and a blinker switch 74 included in the vehicle 60 that are described later. Further, as the vehicle information, the acquisition unit 21D acquires the engine speed, engine torque, fuel efficiency and accelerator operation of the vehicle 60 that are detected by a later-described ECU 70C included in the vehicle 60. The above information is some of the vehicle information that can be acquired from the vehicle 60 by the acquisition unit 21D, and as the vehicle information, the acquisition unit 21D acquires also information relevant to the vehicle 60 and other than the above information, from the vehicle 60.

The calculation unit 21E calculates the respective individual evaluation values for the calculation items within the upper limits of the individual evaluation values that are decided by the decision unit 21C, based on the vehicle information acquired by the acquisition unit 21D. In the embodiment, the calculation unit 21E calculates respective evaluation values for the constituent items constituting the calculation items, based on the vehicle information, and calculates the respective individual evaluation values for the calculation items by summing the calculated respective evaluation values for the constituent items. Further, the calculation unit 21E calculates a total evaluation value by summing the calculated respective individual evaluation values for the calculation items.

The generation unit 21F generates display information that is displayed on the driver terminal 40 as the driving diagnosis result of the driver of the vehicle 60. As an example, the display information is configured to include message information indicating a message to the driver, graph information indicating the driving diagnosis result as a graph, fuel efficiency information indicating the average fuel efficiency of the vehicle 60, rank information indicating the rank of the driver diagnosis result of the driver, and information (referred to as "item information" hereinafter) relevant to the constituent items constituting the calculation items. As an example, the generation unit 21F generates the above display information based on the vehicle information acquired by the acquisition unit 21D and the individual evaluation values and total evaluation value calculated by the calculation unit 21E.

In the case where the individual evaluation value calculated by the calculation unit 21E is lower than a predetermined first threshold, the generation unit 21F generates the message information including information (referred to as "improvement information" hereinafter) relevant to a driving that it is necessary to encourage the driver to improve. In the embodiment, as an example, the improvement information is configured to include a driving content that it is necessary to encourage the driver to improve and the number of occurrences of the driving content per unit time.

Further, in the case where the individual evaluation value calculated by the calculation unit 21E is higher than a predetermined second threshold, the generation unit 21F generates message information including information that praises the driver (referred to as "praise information" hereinafter).

Furthermore, as a display content relevant to the calculation item, the generation unit 21F generates graph information indicating specification information specifying the calculation item, the individual evaluation values, and the ratios of the individual evaluation values in the total evaluation value in manners that are different depending on the calculation items. In the embodiment, as an example, the generation unit 21F generates the graph information in which different colors are adopted depending on the calculation items as the above different manners.

The control unit 21G performs a display control of the display unit 46 of the driver terminal 40. The control unit 21G sends the display information generated by the generation unit 21F to the driver terminal 40 and displays the display information on the display unit 46, when a predetermined Web application (referred to as a "driving diagnosis application" hereinafter) is executed in the driver terminal 40. A specific example of the display control of the display unit 46 of the driver terminal 40 that is performed by the control unit 21G will be described later.

Figure 4:
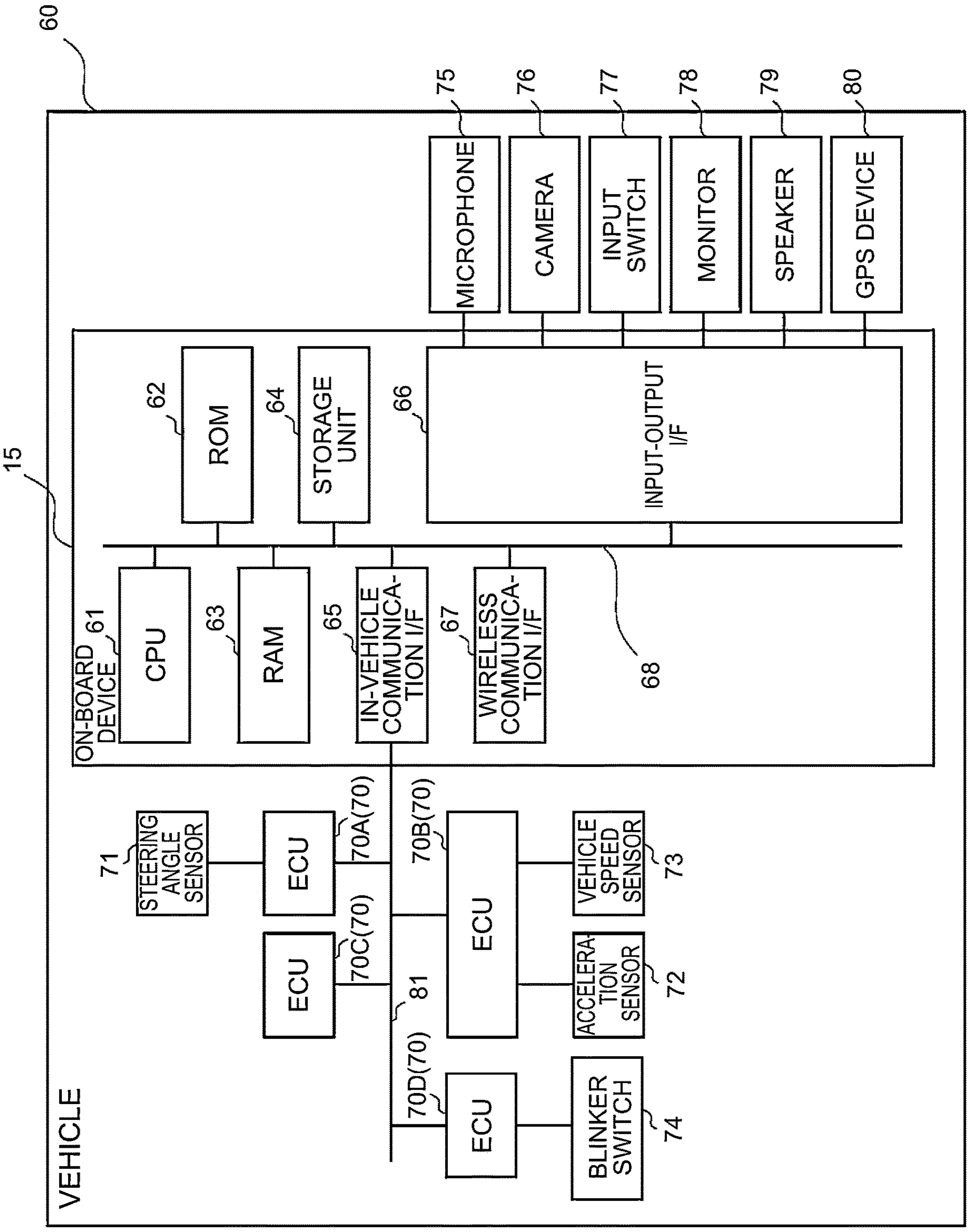
FIG. 4 is a block diagram showing a hardware configuration of a vehicle according to the embodiment.

Next, a hardware configuration of the vehicle 60 will be described. FIG. 4 is a block diagram showing the hardware configuration of the vehicle 60.

As shown in FIG. 4, the vehicle 60 is configured to include an on-board device 15, a plurality of electronic control units (ECUs) 70, the steering angle sensor 71, the acceleration sensor 72, the vehicle speed sensor 73, the blinker switch 74, a microphone 75, a camera 76, an input switch 77, a monitor 78, a speaker 79 and a GPS device 80.

The on-board device 15 is configured to include a CPU 61, a ROM 62, a RAM 63, a storage unit 64, an in-vehicle communication interface (I/F) 65, an input-output I/F 66 and a wireless communication I/F 67. The CPU 61, the ROM 62, the RAM 63, the storage unit 64, the in-vehicle communication I/F 65, the input-output I/F 66 and the wireless communication I/F 67 are connected through an internal bus 68 in a mutually communicable manner.

The CPU 61, which is a central arithmetic processing unit, executes a variety of programs and controls the units. That is, the CPU 61 reads programs from the ROM 62 or the storage unit 64, and executes programs using the RAM 63 as a working area. The CPU 61 performs controls of the above constituents and a variety of arithmetic processes, in accordance with the programs recorded in the ROM 62 or the storage unit 64.

The ROM 62 contains a variety of programs and a variety of data. The RAM 63 temporarily stores programs or data, as a working area.

The storage unit 64 is constituted by a storage device such as a HDD, a SSD or a flash memory, and contains a variety of programs and a variety of data.

The in-vehicle communication I/F 65 is an interface for connection with the ECU 70. For the interface, a communication standard based on a CAN protocol is used. The in-vehicle communication I/F 65 is connected with an external bus 81.

The ECU 70 is provided with a plurality of ECUs for functions of the vehicle 60, and in the embodiment, an ECU 70A, an ECU 70B, an ECU 70C and an ECU 70D are provided. The ECU 70A is an ECU for an electronic power steering, for example, and the steering angle sensor 71 is connected with the ECU 70A. Further, the ECU 70B is an ECU for vehicle stability control (VSC), for example, and the acceleration sensor 72 and the vehicle speed sensor 73 are connected with the ECU 70B. A yaw rate sensor may be connected with the ECU 70B, in addition to the acceleration sensor 72 and the vehicle speed sensor 73.

The ECU 70C is an engine ECU, for example, and detects the engine speed and engine torque of the vehicle 60 for controlling an engine. Further, the ECU 70C detects the fuel efficiency based on the fuel flow acquired from unillustrated sensors. Furthermore, the ECU 70C detects the accelerator operation of the vehicle 60. The engine speed, engine torque, fuel efficiency and accelerator operation detected by the ECU 70C are stored in the storage unit 64 and are sent to the information processing device 20 as the vehicle information. Further, the ECU 70D is a steering ECU, for example, and the blinker switch 74 is connected with the ECU 70D. The blinker switch 74 is provided on a steering column for actuating a blinker. The ECU 70D detects the operation of the blinker switch 74 by the driver, as a blinker operation. The blinker operation detected by the ECU 70D is stored in the storage unit 64, and is sent to the information processing device 20 as the vehicle information.

The steering angle sensor 71 is a sensor for detecting the steering angle of a steering wheel. The steering angle detected by the steering angle sensor 71 is stored in the storage unit 64, and is sent to the information processing device 20 as the vehicle information.

The acceleration sensor 72 is a sensor for detecting the acceleration that acts on the vehicle 60. As an example, the acceleration sensor 72 is a triaxial acceleration sensor, and detects an acceleration in a vehicle front-rear direction as an X-axis direction, an acceleration in a vehicle width direction as a Y-axis direction, and an acceleration in a vehicle height direction as a Z-axis direction. The acceleration detected by the acceleration sensor 72 is stored in the storage unit 64, and is sent to the information processing device 20 as the vehicle information.

The vehicle speed sensor 73 is a sensor for detecting the vehicle speed of the vehicle 60. For example, the vehicle speed sensor 73 is a sensor that is provided in a wheel. The vehicle speed detected by the vehicle speed sensor 73 is stored in the storage unit 64, and is sent to the information processing device 20 as the vehicle information.

The input-output I/F 66 is an interface for communicating with the microphone 75, the camera 76, the input switch 77, the monitor 78, the speaker 79 and the GPS device 80 that are equipped in the vehicle 60.

The microphone 75 is a device that is provided on a front pillar, a dashboard or the like in the vehicle 60 and that collects the voice from the driver of the vehicle 60. The microphone 75 may be provided on the later-described camera 76.

As an example, the camera 76 is configured to include a charge coupled device (CCD) image sensor. As an example, the camera 76 is provided at a front portion of the vehicle 60, and photographs a forward view of the vehicle. As an example, the image photographed by the camera 76 is used for recognizing an inter-vehicle distance from a leading vehicle that travels forward of the vehicle, a lane, a traffic light and others. The image photographed by the camera 76 is stored in the storage unit 64, and is sent to the information processing device 20. The camera 76 may be configured as a photographing device having another intended use, as exemplified by a drive recorder. The camera 76 may be connected with the on-board device 15 through the ECU 70 (for example, a camera ECU).

The input switch 77 is a switch that is provided on an instrument panel, a center console, a steering wheel or the like and to which an operation by a finger of the driver is input. As the input switch 77, for example, a push-button numeric keypad, a touch pad or the like can be employed.

The monitor 78 is a liquid crystal monitor that is provided on the instrument panel, a meter panel or the like and that displays a proposal of actuation about a function of the vehicle 60 and an image about the explanation of the function. The monitor 78 may be provided as a touch panel that serves also as the input switch 77.

The speaker 79 is a device that is provided on the instrument panel, the center console, the front pillar, the dashboard or the like and that outputs a proposal of actuation about a function of the vehicle 60 and a voice about the explanation of the function. The speaker 79 may be provided on the monitor 78.

The GPS device 80 is a device that measures the current position of the vehicle 60. The GPS device 80 includes an unillustrated antenna that receives a signal from a GPS satellite. The GPS device 80 may be connected with the on-board device 15 through a car navigation system that is connected with the ECU 70 (for example, a multimedia ECU).

The wireless communication I/F 67 is a wireless communication module for communicating with the information processing device 20. For the wireless communication module, for example, a communication standard such as 5G, LTE and Wi-Fi (R) is used. The wireless communication I/F 67 is connected to the network N.

Figure 5:
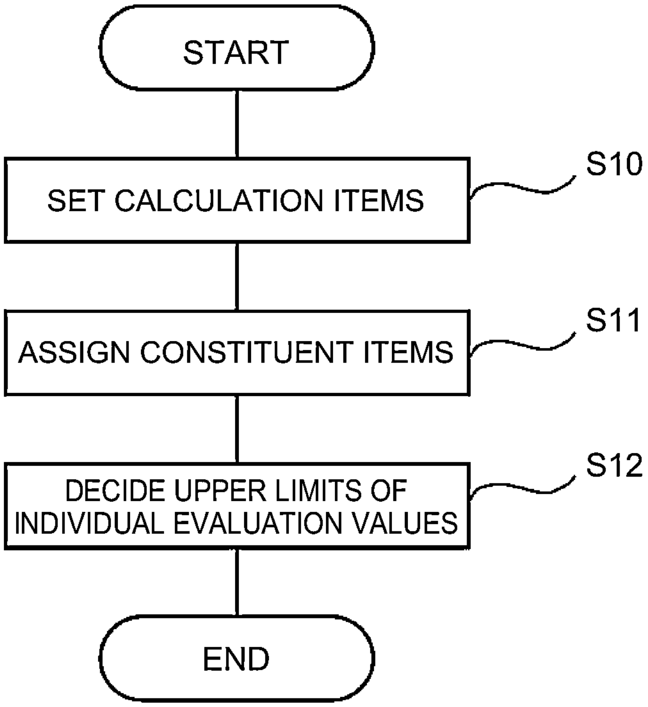
FIG. 5 is a flowchart showing a flow of a setting process by the information processing device according to the embodiment.

FIG. 5 is a flowchart showing a flow of a setting process in which the information processing device 20 performs a setting relevant to the driving diagnosis result of the driver of the vehicle 60 that is displayed on the driver terminal 40. The CPU 21 reads the information processing program 24A from the storage unit 24, and expands and executes the information processing program 24A on the RAM 23, so that the setting process is performed.

In step S10 shown in FIG. 5, the CPU 21 accepts a setting of calculation items that are displayed on the display unit 46 of the driver terminal 40, from a predetermined business operator that possesses the information processing device 20. Then, the CPU 21 proceeds to step S11. As an example, the CPU 21 displays a setting screen shown in FIG. 6 described below on the display unit 26, and accepts the setting of the calculation items on the setting screen from the business operator.

Figure 6:
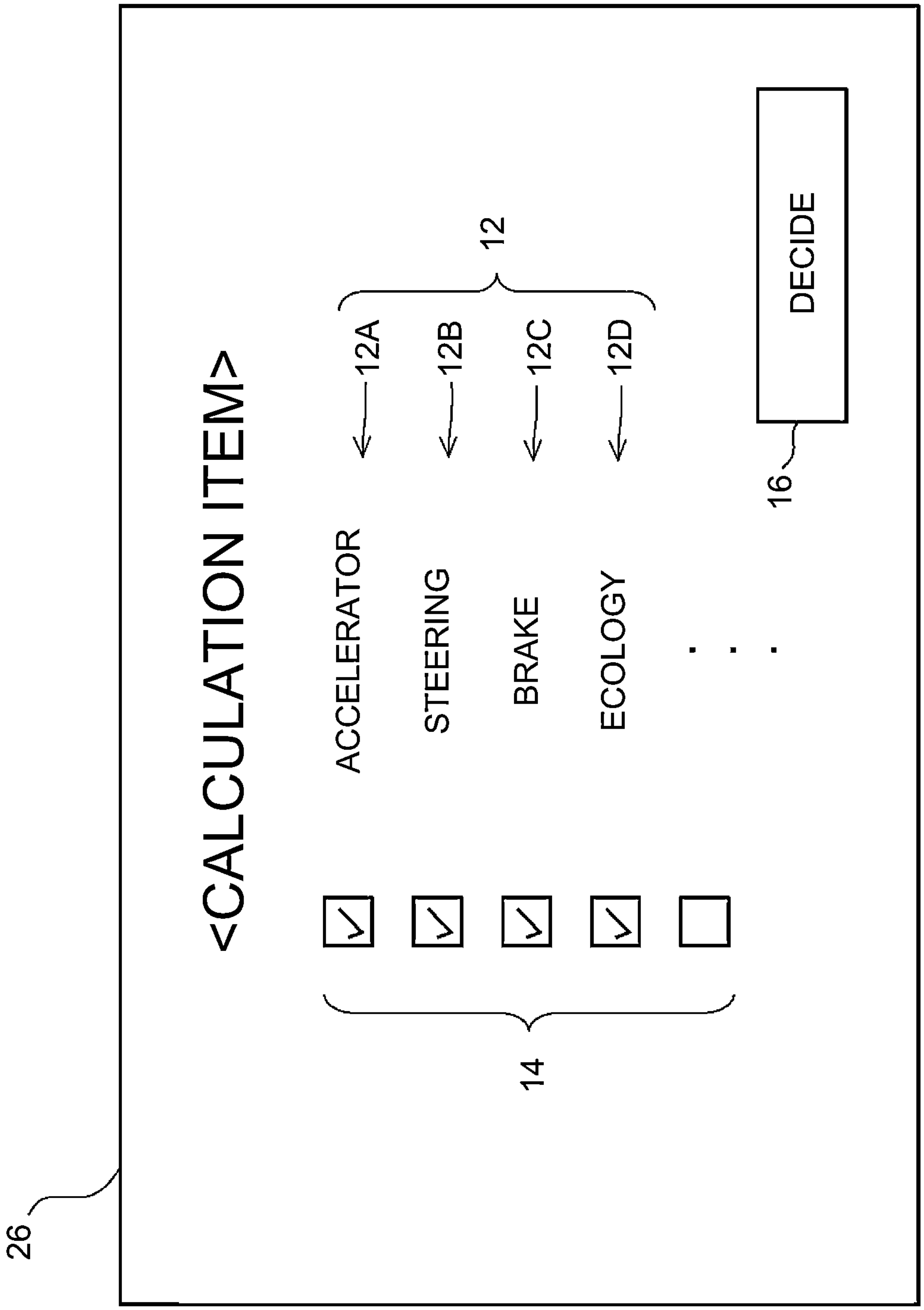
FIG. 6 is a display example of a setting screen that is displayed on a display unit of the information processing device according to the embodiment.

FIG. 6 is a display example of the setting screen that is displayed on the display unit 26 of the information processing device 20. On the setting screen shown in FIG. 6, a specification information display portion 12, a checkbox 14 and a decision button 16 are displayed.

The specification information display portion 12 is a portion for showing specification information that specifies calculation items for which the selection of the display on the display unit 46 of the driver terminal 40 is accepted. As an example, the specification information display portion 12 is configured to include a first display portion 12A showing that the calculation item that is displayed as the specification information is "accelerator", a second display portion 12B showing that the calculation item that is displayed as the specification information is "steering", a third display portion 12C showing that the calculation item that is displayed as the specification information is "brake", a fourth display portion 12D showing that the calculation item that is displayed as the specification information is "ecology", and others.

The checkbox 14 is a portion for accepting the selection of the calculation items that are displayed as the specification information on the display unit 46 of the driver terminal 40. As an example, in the embodiment, one or more checkboxes 14 can be selected. In the setting screen shown in FIG. 6, check marks are put on four checkboxes 14 at an upper portion. Thereby, the setting screen shown in FIG. 6 shows that the calculation items for which the selection of the display on the display unit 46 as the specification information is accepted are "accelerator", "steering", "brake" and "ecology".

The decision button 16 is a button for deciding the content of the calculation items for which the selection is accepted by the checkbox 14. The decision button 16 cannot be operated until one or more checkboxes 14 are selected.

When the decision button 16 is operated on the setting screen shown in FIG. 6, the CPU 21 accepts the calculation items of "accelerator", "steering", "brake" and "ecology", as the specification information that is displayed on the display unit 46 of the driver terminal 40, in step S10 shown in FIG. 5.

Back to FIG. 5, in step S11, the CPU 21 assigns a plurality of constituent items constituting the calculation items for which the setting has been accepted in step S10. Then, the CPU 21 proceeds to step S12. As an example, based on the correspondence table stored in the storage unit 24, the CPU 21 assigns constituent items such that each of the calculation items for which the setting has been accepted in step S10 is constituted by the top five constituent items that have high relevance degrees with respect to the calculation item.

In step S12, the CPU 21 decides the upper limits of the respective individual evaluation value for the calculation items for which the setting has been accepted in step S10. Then, the CPU 21 ends the process. As an example, the CPU 21 divides the previously determined value "100" by "4" which is the number of the calculation items for which the setting has been accepted in step S10, and decides that each of the upper limits of the respective individual evaluation value for the calculation items is "25".

Figure 7:
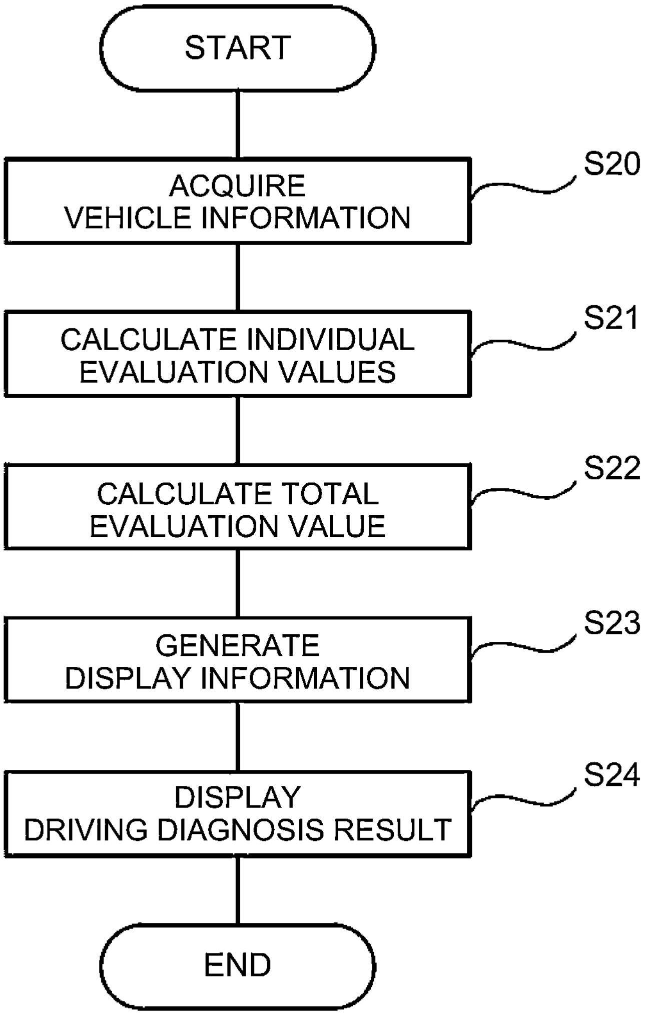
FIG. 7 is a flowchart showing a flow of a display process by the information processing device according to the embodiment.

FIG. 7 is a flowchart showing a flow of a display process in which the information processing device 20 displays the driving diagnosis result of the driver of the vehicle 60 on the driver terminal 40. The CPU 21 reads the information processing program 24A from the storage unit 24, and expands and executes the information processing program 24A on the RAM 23, so that the display process is performed.

In step S20 shown in FIG. 7, the CPU 21 acquires the vehicle information from the vehicle 60. Then, the CPU 21 proceeds to step S21. In the embodiment, as an example, the vehicle information is periodically sent from the vehicle 60 to the information processing device 20.

In step S21, based on the vehicle information acquired in step S20, the CPU 21 calculates the respective individual evaluation values for the calculation items within "25", which is the upper value of the individual evaluation values that is decided in step S12 shown in FIG. 5. Then, the CPU 21 proceeds to step S22.

In step S22, the CPU 21 calculates the total evaluation value by summing the individual evaluation values calculated in step S21. Then, the CPU 21 proceeds to step S23.

In step S23, the CPU 21 generates the display information that is displayed on the driver terminal 40 as the driving diagnosis result of the driver of the vehicle 60. Then, the CPU 21 proceeds to step S24. As an example, the CPU 21 generates the display information including the message information, the graph information, the fuel efficiency information, the rank information and the constituent item information, based on the vehicle information acquired in step S20, the individual evaluation values calculated in step S21 and the total evaluation value calculated in step S22.

In step S24, the CPU 21 sends the display information generated in step S23 to the driver terminal 40, and displays the display information on the display unit 46 as the driving diagnosis result of the driver of the vehicle 60. Then, the CPU 21 ends the process.

Next, display examples that are displayed on the display unit 46 of the driver terminal 40 as a result of the display process shown in FIG. 7 by the information processing device 20 will be described.

Figure 8:
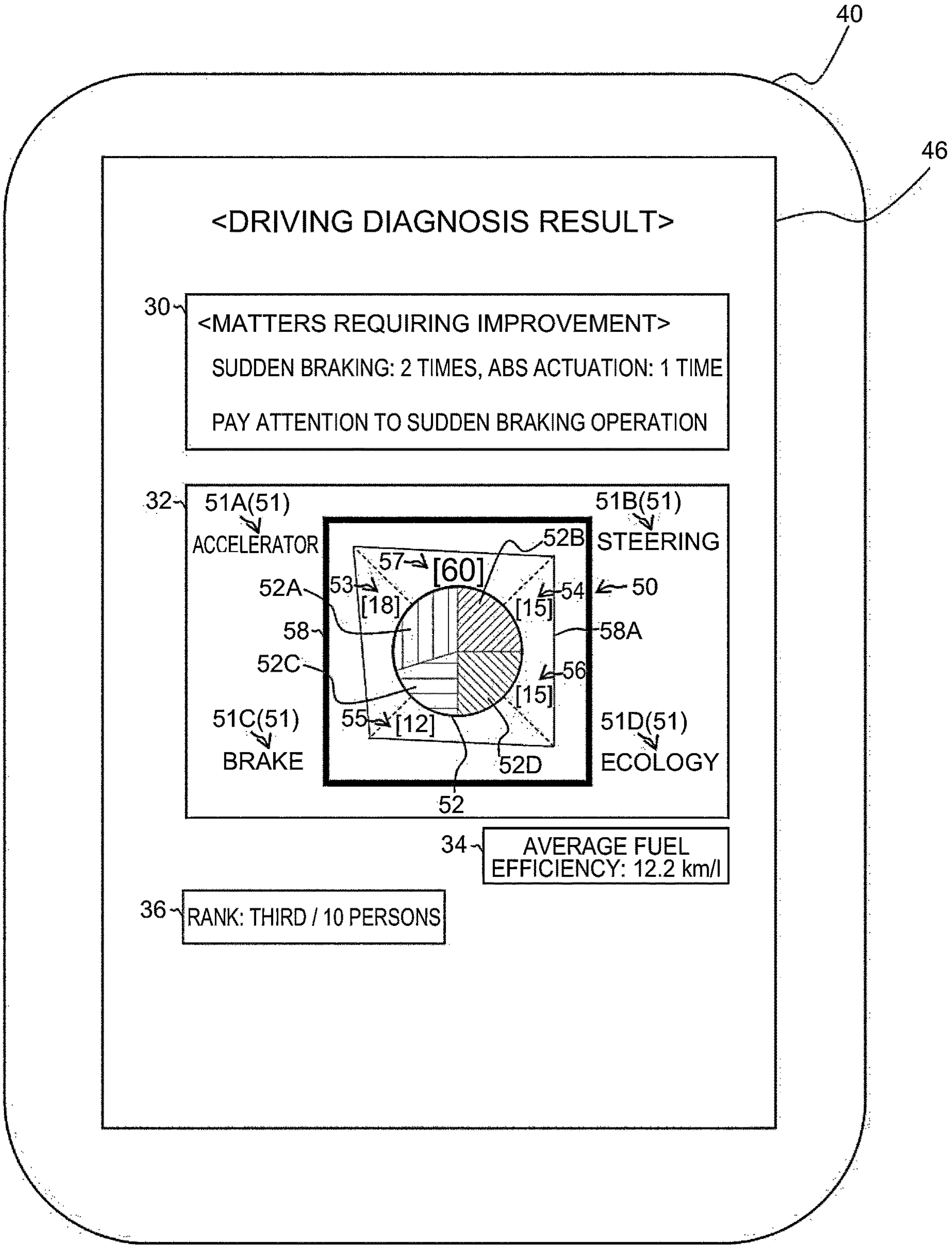
FIG. 8 is a first display example that is displayed on the display unit of the driver terminal according to the embodiment.

FIG. 8 shows a first display example that is displayed on the display unit 46 of the driver terminal 40. The CPU 21 of the information processing device 20 displays the display example shown in FIG. 8 on the display unit 46, when the driving diagnosis application is executed in the driver terminal 40 and a previously determined operation is performed to the driving diagnosis application.

In the display example shown in FIG. 8, a message display portion 30, a graph display portion 32, a fuel efficiency display portion 34 and a rank display portion 36 are displayed.

The message display portion 30 is a portion for displaying a message indicated by the message information of the display information sent from the information processing device 20.

Suppose that the CPU 21 of the information processing device 20 sends the message information including the improvement information to the driver terminal 40 because there is an individual evaluation value lower than the first threshold in the respective individual evaluation values for the calculation items that are calculated in step S21 shown in FIG. 7. Therefore, at the message display portion 30 shown in FIG. 8, "<Matters requiring improvement> Sudden braking: 2 times, ABS actuation: 1 time, Pay attention to sudden braking operation" is displayed as an example of the message (referred to as an "improvement message" hereinafter) that is indicated by the message information including the improvement information. In this case, "Sudden braking" and "ABS actuation" correspond to the driving contents configuring the improvement information, and "2 times" and "1 time" correspond to the numbers of occurrences of the driving contents configuring the improvement information.

The graph display portion 32 is a portion for displaying a graph 50 indicated by the graph information of the display information sent from the information processing device 20. As shown in FIG. 8, the graph 50 is configured to include specification information 51, a circle graph 52 and a radar chart 58.

The specification information 51 is information that allows the driver to visually specify the calculation items for which the setting by the predetermined business operator possessing the information processing device 20 has been accepted in step S10 shown in FIG. 5. As an example, the specification information 51 is configured to include first specification information 51A displayed at an upper left portion in the graph display portion 32, second specification information 51B displayed at an upper right portion, third specification information 51C displayed at a lower left portion and fourth specification information 51D displayed at a lower right portion. The first specification information 51A indicates that the corresponding calculation item is "accelerator", the second specification information 51B indicates that the corresponding calculation item is "steering", the third specification information 51C indicates that the corresponding calculation item is "brake", and the fourth specification information 51D indicates that the corresponding calculation item is "ecology". Each piece of the specification information 51 is configured by an icon that can be selected by the driver. When the selection is accepted, the screen of the display unit 46 is switched, and a display content corresponding to the selected icon is displayed. Details will be described later.

The circle graph 52 is divided into four regions based on the ratios of later-described individual evaluation values 53, 54, 55, 56 corresponding to the calculation items indicated by the specification information 51 in a later-described total evaluation value 57. Specifically, the circle graph 52 is divided into a first region 52A that corresponds to "accelerator" indicated by the first specification information 51A and that occupies 30% of the circle graph 52, a second region 52B that corresponds to "steering" indicated by the second specification information 51B and that occupies 25% of the circle graph 52, a third region 52C that corresponds to "brake" indicated by the third specification information 51C and that occupies 20% of the circle graph 52, and a fourth region 52D that corresponds to "ecology" indicated by the fourth specification information 51D and that occupies 25% of the circle graph 52, as the four regions.

The individual evaluation value 53 corresponding to "accelerator" indicated by the first specification information 51A is displayed near the first region 52A, the individual evaluation value 54 corresponding to "steering" indicated by the second specification information 51B is displayed near the second region 52B, the individual evaluation value 55 corresponding to "brake" indicated by the third specification information 51C is displayed near the third region 52C, and the individual evaluation value 56 corresponding to "ecology" indicated by the fourth specification information 51D is displayed near the fourth region 52D. In the display example shown in FIG. 8, "18" is displayed as the individual evaluation value 53, "15" is displayed as the individual evaluation value 54, "12" is displayed as the individual evaluation value 55, and "15" is displayed as the individual evaluation value 56.

Based on the graph information sent to the driver terminal 40, the CPU 21 of the information processing device 20 displays the specification information 51, the individual evaluation values 53, 54, 55, 56, the first region 52A, the second region 52B, the third region 52C and the fourth region 52D, as display contents relevant to the calculation items, using colors that are different from each other depending on the calculation items.

As an example, the CPU 21 displays the first region 52A with vertical lines in the region in "blue", displays the second region 52B with left-downward diagonal lines in the region in "green", displays the third region 52C with horizontal lines in the region in "yellow", and displays the fourth region 52D with right-downward diagonal lines in the region in "red". Furthermore, in this case, the CPU 21 displays the letter color of the first specification information 51A and the individual evaluation value 53 in "blue" similarly to the first region 52A, displays the letter color of the second specification information 51B and the individual evaluation value 54 in "green" similarly to the second region 52B, displays the letter color of the third specification information 51C and the individual evaluation value 55 in "yellow" similarly to the third region 52C, and displays the letter color of the fourth specification information 51D and the individual evaluation value 56 in "red" similarly to the fourth region 52D.

Further, the total evaluation value 57 that is the total of the individual evaluation values 53, 54, 55, 56 is displayed above the circle graph 52. In the display example shown in FIG. 8, "60" is displayed as the total evaluation value 57.

In the radar chart 58 shown in FIG. 8, a rectangular result data 58A expressed by straight lines connecting data of adjacent individual evaluation values 53, 54, 55, 56 of data of the individual evaluation values 53, 54, 55, 56 plotted in a thick frame having a square shape is displayed, The fuel efficiency display portion 34 is a portion for displaying the average fuel efficiency of the vehicle 60 that is indicated by the fuel efficiency information of the display information sent from the information processing device 20. As an example, "Average fuel efficiency: 12.2 km/l" is displayed at the fuel efficiency display portion 34 shown in FIG. 8.

The CPU 21 of the information processing device 20 displays, in an adjacent manner on the display unit 46, the specification information that specifies a previously determined calculation item and information (referred to as "relevant information" hereinafter) relevant to the calculation item. In the embodiment, as an example, the previously determined calculation item is "ecology", the specification information is "the fourth specification information 51D", and the relevant information is "the average fuel efficiency of the vehicle 60".

The rank display portion 36 is a portion for displaying the rank of the driver diagnosis result of the driver that is indicated by the rank information of the display information sent from the information processing device 20. As an example, "Rank: third/10 persons" is displayed at the rank display portion 36 shown in FIG. 8.

As described above, the CPU 21 of the information processing device 20 displays the message to the driver, the graph 50, the average fuel efficiency of the vehicle 60 and the rank of the driving diagnosis result of the driver, on a single screen of the display unit 46 of the driver terminal 40. Without being limited to this, the message to the driver and the graph 50 may be displayed on a single screen of the display unit 46 of the driver terminal 40, and the average fuel efficiency of the vehicle 60 and the rank of the driving diagnosis result of the driver may be displayed on another screen that is different from the single screen.

Figure 9:
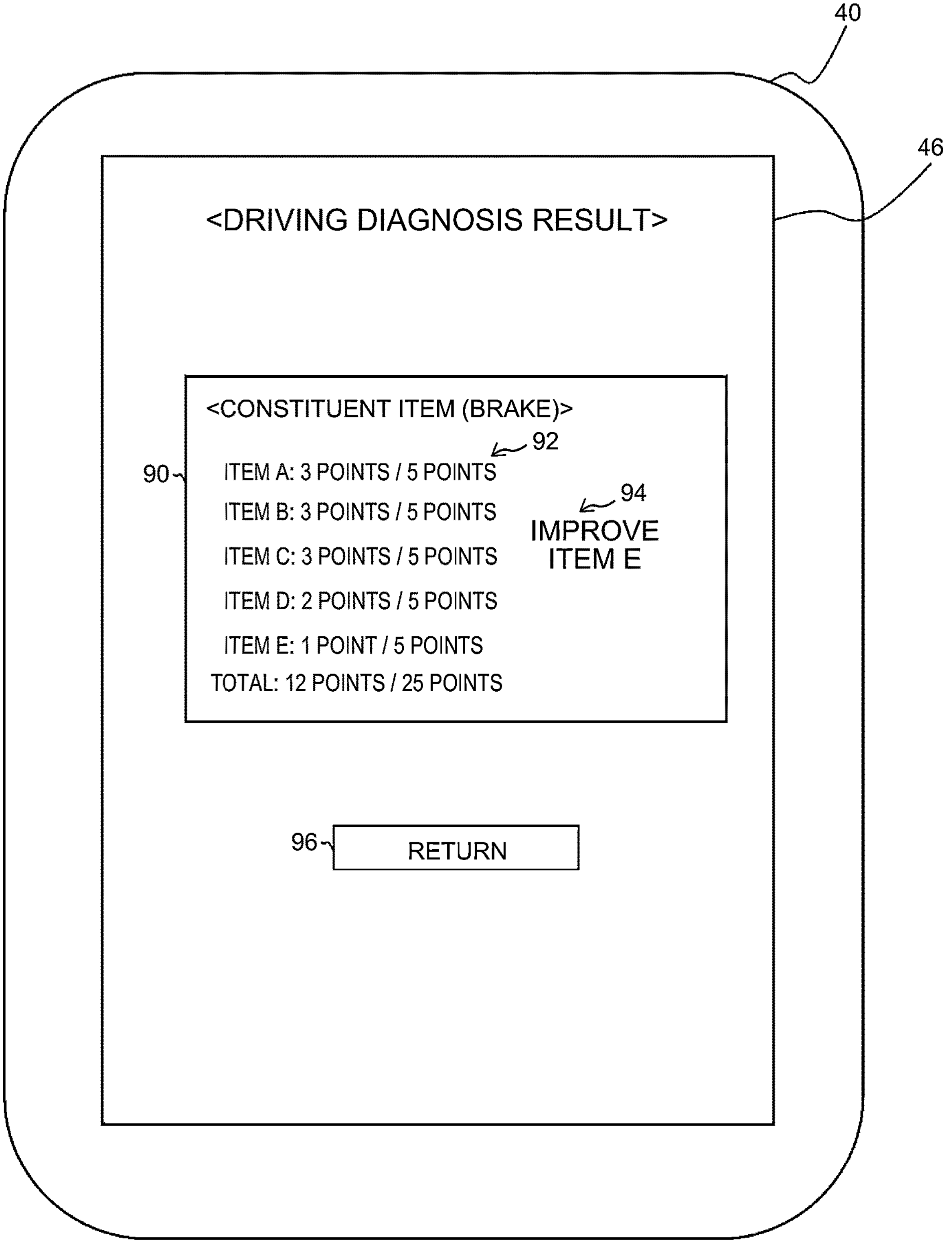
FIG. 9 is a second display example that is displayed on the display unit of the driver terminal according to the embodiment.

FIG. 9 is a second display example that is displayed on the display unit 46 of the driver terminal 40. The display example shown in FIG. 9 shows a state after the third specification information 51C is selected in the display example shown in FIG. 8.

In the display example shown in FIG. 9, an item information display portion 90 and a return button 96 are displayed.

The item information display portion 90 is a portion for displaying the item information of the display information sent from the information processing device 20. At the item information display portion 90, evaluation value information 92 indicating the evaluation value for each constituent item and advice information 94 indicating an advice that contributes to increase in the evaluation value of the constituent item are displayed as the item information.

As an example, at the item information display portion 90 shown in FIG. 9, "Item A: 3 points/5 points Item B: 3 points/5 points Item C: 3 points/5 points Item D: 2 points/5 points Item E: 1 point/5 points Total: 12 points/25 points" is displayed as the evaluation value information 92. Further, at the item information display portion 90 shown in FIG. 9, "Improve Item E." is displayed as the advice information 94. In FIG. 9, for explanatory convenience, constituent items are expressed as "Item A", "Item B" and the like, but constituent items constituting the calculation item "brake", as exemplified by "Sudden braking" and "Temporary stop", are displayed on an actual screen of the driver terminal 40.

The return button 96 is a button for changing the display content of the display unit 46. When the return button 96 is operated during the display of the display example shown in FIG. 9, the CPU 21 of the information processing device 20 changes the display content of the display unit 46, and displays the display example shown in FIG. 8, on the display unit 46.

Figure 10:
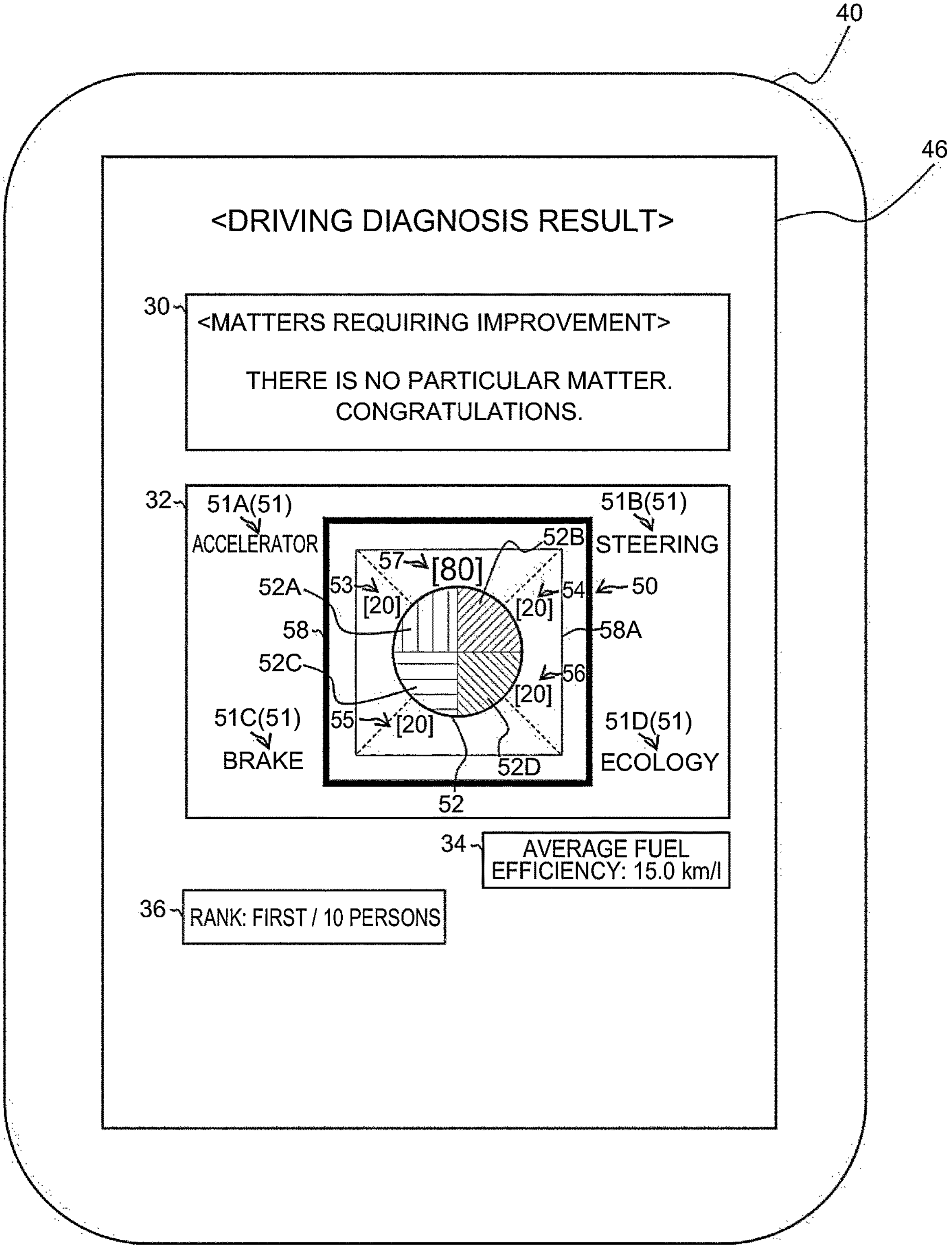
FIG. 10 is a third display example that is displayed on the display unit of the driver terminal according to the embodiment.

FIG. 10 is a third display example that is displayed on the display unit 46 of the driver terminal 40. As an example, the display example shown in FIG. 10 shows the driving diagnosis result of the driver of the vehicle 60 on a day that is different from a day when the display example shown in FIG. 8 is displayed on the display unit 46.

In the display example shown in FIG. 10, the message display portion 30, the graph display portion 32, the fuel efficiency display portion 34 and the rank display portion 36 are displayed similarly to the display example shown in FIG. 8.

Suppose that the CPU 21 of the information processing device 20 sends the message information including the praise information to the driver terminal 40 because the respective individual evaluation values for the calculation items that are calculated in step S21 shown in FIG. 7 are higher than the second threshold. Therefore, at the message display portion 30 shown in FIG. 10, "<Matters requiring improvement> There is no particular matter. Congratulations." is displayed as an example of the message that is indicated by the message information including the praise information.

At the graph display portion 32 shown in FIG. 10, "20" is displayed as the individual evaluation values 53, 54, 55, 56 in the graph 50. Further, in the display example shown in FIG. 10, "80" is displayed as the total evaluation value 57.

In the display example shown in FIG. 10, each of the individual evaluation values 53, 54, 55, 56 is "20", and each of the first region 52A, the second region 52B, the third region 52C and the fourth region 52D occupies 25% of the circle graph 52. Thereby, the result data 58A in the radar chart 58 shown in FIG. 10 is displayed as a square shape, unlike the shape of the result data 58A shown in FIG. 8.

As an example, "Average fuel efficiency: 15.0 km/l" is displayed at the fuel efficiency display portion 34 shown in FIG. 10.

As an example, "Rank: first/10 persons" is displayed at the rank display portion 36 shown in FIG. 10.

As described above, in the embodiment, the CPU 21 decides the upper limits of the respective individual evaluation values for the plurality of calculation items such that the total of the upper limits of the respective individual evaluation values for the calculation items is the previously determined value. Further, the CPU 21 acquires the vehicle information relevant to the vehicle 60. Further, the CPU 21 calculates the respective individual evaluation values for the calculation items within the decided upper limits of the individual evaluation values, based on the acquired vehicle information. Then, the CPU 21 displays, on the display unit 46, the calculated respective individual evaluation values for calculation items and the total evaluation value that is the total of the respective individual evaluation values for the calculation items. Thereby, in the embodiment, by displaying the respective individual evaluation values 53, 54, 55, 56 for the calculation items and the total evaluation value 57 (see FIG. 8 and FIG. 10), it is possible to grasp the relation between the individual evaluation values for the calculation items and the total evaluation value that is the total of the individual evaluation values for the calculation items, at first glance.

In the embodiment, the plurality of constituent items constituting the calculation items is provided. The CPU 21 assigns the constituent items such that the constituent items constitute the calculation items, based on the previously determined relation between the calculation items and the constituent items, specifically, based on the level of the relevance degree. Thereby, in the embodiment, for example, the calculation items are constituted by a plurality of constituent items having high relevance degrees, and therefore, it is possible to give unity to a plurality of constituent items constituting each calculation item.

In the embodiment, the CPU 21 accepts the setting of the calculation items that are displayed on the display unit 46 of the driver terminal 40, from the predetermined business operator that possess the information processing device 20. Thereby, in the embodiment, the driver can grasp calculation items on which the business operator places importance.

In the embodiment, when the CPU 21 accepts the selection of the specification information 51 displayed on the display unit 46 of the driver terminal 40, the CPU 21 switches the screen of the display unit 46, and displays the item information about the calculation item corresponding to the selected specification information 51. Specifically, the CPU 21 displays the evaluation value information 92 and the advice information 94 on the display unit 46, as the item information (see FIG. 9). Thereby, in the embodiment, it is possible to restrain the decrease in the visibility for the driver that looks at the display unit 46, compared to a case where the item information, the specification information 51, the individual evaluation values and the total evaluation value are displayed on an identical screen.

In the embodiment, when it is necessary to encourage the driver to improve the driving based on the calculated respective individual evaluation values for the calculation items, the CPU 21 displays the improvement message on the display unit 46 (see FIG. 8). As an example, when there is an individual evaluation value lower than the first threshold in the calculated respective individual evaluation values for the calculation items, the CPU 21 determines "it is necessary to encourage the driver to improve the driving", and displays the message on the display unit 46.

Further, when it is not necessary to encourage the driver to improve the driving based on the calculated respective individual evaluation values for the calculation items, the CPU 21 displays the message indicating the message information including the praise information, on the display unit 46 (see FIG. 10). As an example, when the calculated respective individual evaluation values for the calculation items are higher than the second threshold, the CPU 21 determines "it is not necessary to encourage the driver to improve the driving", and displays the message on the display unit 46.

By the above configuration, in the embodiment, it is possible to change the information that is seen by the driver, depending on whether it is necessary to encourage the driver to improve the driving.

In the embodiment, the CPU 21 displays the display contents relevant to the calculation items, on the display unit 46, in manners that are different depending on the calculation items. The CPU 21 displays the ratios of the respective individual evaluation values for the calculation items in the total evaluation value, on the display unit 46, in manners that are different depending on the calculation items. As an example, the CPU 21 displays the specification information 51, the individual evaluation values 53, 54, 55, 56, the first region 52A, the second region 52B, the third region 52C and the fourth region 52D, as the display contents relevant to the calculation items, using colors that are different from each other depending on the calculation items (see FIG. 8 and FIG. 10). Thereby, in the embodiment, the driver that looks at the display unit 46 can easily grasp the respective display contents for the calculation items.

In the embodiment, the CPU 21 displays, in an adjacent manner on the display unit 46, the specification information 51 about the calculation item corresponding to the calculated individual evaluation values and the relevant information about the calculation item. As an example, the CPU 21 displays, in an adjacent manner on the display unit 46, the fourth specification information 51D indicating that the corresponding calculation item is "ecology" and the average fuel efficiency of the vehicle 60 that is relevant information about the calculation item "ecology" and that is displayed at the fuel efficiency display portion 34 (see FIG. 8 and FIG. 10). Thereby, in the embodiment, for a predetermined calculation item, it is possible to display the relevant information such that the relevant information is adjacent to the specification information 51 about the calculation item, and for example, by displaying the average fuel efficiency of the vehicle 60 such that the average fuel efficiency of the vehicle 60 is adjacent to the fourth specification information 51D, it is possible to easily grasp the reason why the individual evaluation value 56 for the calculation item "ecology" is good or bad.

Others

In the above embodiment, the kind of the driver of the vehicle 60 in the information processing system 10 has not been mentioned. The driver may be a driver of a business operator that operates the vehicle, as exemplified by a taxi company and a transport company, or alternatively, may be a general driver that privately drives the vehicle.

In the above embodiment, the driver terminal 40 is a portable terminal that is possessed by the driver of the vehicle 60, but without being limited to this, the driver terminal 40 may be a server computer or a general-purpose computer device such as a PC.

In the above embodiment, the previously determined user from which the setting of the calculation items to be displayed on the display unit 46 of the driver terminal 40 is accepted is "the predetermined business operator that possesses the information processing device 20", but without being limited to this, the previously determined user may be the driver of the vehicle 60, a manager that manages the driver, or the like.

In the above embodiment, the CPU 21 of the information processing device 20 decides the upper limits of the respective individual evaluation values for the calculation items by dividing the previously determined value by the numbers of the calculation items for which the setting has been accepted, but the method for deciding the upper limits of the individual evaluation value is not limited to this. As an example, the setting of the upper limits of the respective individual evaluation values for the calculation items may be accepted from the previously determined user such as the driver of the vehicle 60, the manager that manages the driver, and the predetermined business operator that possesses the information processing device 20. Thereby, in the information processing system 10, each user can perform customization, for example, the previously determined user can set the upper limit of the individual evaluation value for a calculation item on which the user places importance, to a higher value than other upper limits. Further, in the case where the CPU 21 decides the upper limits of the respective individual evaluation values for the calculation items, as an example, the CPU 21 may decide upper limits that are different depending on the calculation items, based on a predetermined weighting, instead of deciding that each of the upper limits of the respective evaluation values for the calculation items is an identical value.

As described in the above embodiment, the correspondence table showing the relevance degrees of the calculation items with respect to the constituent items is stored in the storage unit 24. On this occasion, as an example, the relevance degrees of the calculation items with respect to the constituent items shown in the correspondence table may be capable of being updated based on an operation by the previously determined user.

In the above embodiment, the CPU 21 of the information processing device 20 calculates the respective evaluation values for the constituent items constituting the calculation item based on the vehicle information, and calculates the individual evaluation value for the calculation item by summing the calculated respective evaluation values for the constituent items, but the method for calculating the individual evaluation value is not limited to this. As another example, the CPU 21 may add predetermined weights to the respective evaluation values for the constituent items that are calculated based on the vehicle information, and may calculate the individual evaluation value for the calculation item by summing the values after the weighting. Further, as another example, the CPU 21 may calculate the respective evaluation values for the constituent items constituting the calculation item based on the vehicle information, and may calculate the average value of the calculated respective evaluation values for the constituent items, as the individual evaluation value for the calculation item.

In the above embodiment, on the display unit 46, the CPU 21 of the information processing device 20 displays the display contents relevant to the calculation items, using the colors that are different depending on the calculation items, as the manners that are different depending on the calculation items. However, the different manners are not limited to this, and different character sizes, different fonts and the like may be used, or different patterns may be put in the region.

In the above embodiment, the selection of arbitrary calculation items from the previously prepared calculation items is accepted on the setting screen shown in FIG. 6, but the method for accepting the calculation items is not limited to this. As another example, calculation items may be capable of being input on the setting screen by the previously determined user, and a desired calculation item may be capable of being generated by the user oneself.

In the above embodiment, the specification information 51 about the previously determined calculation item that is displayed on the display unit 46 so as to be adjacent to the relevant information is "the fourth specification information 51D", but without being limited to this, the specification information 51 may be different specification information 51.

In the above embodiment, the layout of the display information that is displayed on the display unit 46 as the driving diagnosis result is the same between the display example shown in FIG. 8 and the display example shown in FIG. 10, which are displayed on the display unit 46 on different days, but the layout of the display information may be different depending on a previously determined period (for example, one day, one week or one month).

In the above embodiment, when it is necessary to encourage the driver to improve the driving based on the calculated respective individual evaluation values for the calculation items, the CPU 21 of the information processing device 20 displays the improvement message on the display unit 46 (see FIG. 8). At this time, when all improvement messages cannot be displayed at the message display portion 30, as an example, the CPU 21 may preferentially display an improvement message including some improvement information about driving contents configuring the improvement information for which the number of occurrences is large or driving contents for which a previously determined danger degree is high. In this case, the CPU 21 may display all improvement messages on the display unit 46 by changing the display content of the display unit 46 when the selection of the message display portion 30 is accepted.

In the above embodiment, when the CPU 21 accepts the selection of the improvement message displayed at the message display portion 30, the CPU 21 may display, on the display unit 46, a place where a driving content included in improvement information corresponding to the selected improvement message was performed, an image photographed by the camera 76 when the driving content was performed, and others.

In the above embodiment, the case where the number of calculation items is "4" has been described as an example. However, the number of calculation items is not limited to this, and may be larger than "4" or smaller than "4".

In the above embodiment, the setting process and display process that are executed by the CPU 21 reading software (programs) may be executed by various processors other than the CPU. In this case, examples of the processors include a programmable logic device (PLD) in which the circuit configuration can be changed after the production, as exemplified by a field-programmable gate array (FPGA), and a dedicated electric circuit that is a processor having a specially designed circuit configuration for executing a particular process, as exemplified by an application specific integrated circuit (ASIC). Further, the setting process and the display process may be executed by one of the various processors, or may be executed by a combination of two or more processors of the same kind or different kinds (for example, a combination of a plurality of FPGAs or a combination of a CPU and a FPGA). Further, each hardware structure of the various processors, more specifically, is an electric circuit in which circuit elements such as semiconductor elements are combined.

Further, in the above embodiment, a configuration in which the information processing program 24A is previously stored (installed) in the storage unit 24 has been described, but the present disclosure is not limited to this. The information processing program 24A may be provided while being recorded in a recording medium such as a compact disk read only memory (CD-ROM), a digital versatile disk read only memory (DVD-ROM) and a universal serial bus (USB) memory. Further, the information processing program 24A may be downloaded from an external device through the network N.

What is claimed is:

1. An information processing device comprising:

a decision unit that decides upper limits of respective individual evaluation values for a plurality of calculation items such that a total of the upper limits of the respective individual evaluation values for the calculation items is a previously determined value, the individual evaluation values being relevant to driving of a driver, the calculation items being calculation items for which the individual evaluation values are calculated;

an acquisition unit that acquires vehicle information relevant to a vehicle;

a calculation unit that calculates the respective individual evaluation values for the calculation items within the upper limits of the individual evaluation values that are decided by the decision unit, based on the vehicle information acquired by the acquisition unit; and a control unit that displays, on a display unit, the respective individual evaluation values for the calculation items that are calculated by the calculation unit and a total evaluation value that is a total of the respective individual evaluation values for the calculation items.

2. The information processing device according to claim 1, wherein:

a plurality of constituent items constituting the calculation items is provided; and the information processing device comprises an assignment unit that assigns the constituent items such that the constituent items constitute the calculation items, based on a previously determined relation between the calculation items and the constituent items.

3. The information processing device according to claim 1, comprising an acceptance unit that accepts a setting of the calculation items that are displayed on the display unit, from a previously determined user.

4. The information processing device according to claim 1, wherein:

a plurality of constituent items constituting the calculation items is provided; and when the control unit accepts a selection of specification information that specifies the calculation items displayed on the display unit, the control unit switches a screen of the display unit and displays information relevant to the constituent items constituting the calculation items corresponding to the specification information for which the selection is accepted.

5. The information processing device according to claim 1, wherein:

when it is necessary to encourage the driver to improve the driving based on the respective individual evaluation values for the calculation items that are calculated by the calculation unit, the control unit displays, on the display unit, information relevant to the driving for which it is necessary to encourage improvement; and when it is not necessary to encourage the driver to improve the driving based on the respective individual evaluation values for the calculation items that are calculated by the calculation unit, the control unit displays, on the display unit, information praising the driver.

6. The information processing device according to claim 1, wherein the control unit displays display contents relevant to the calculation items, on the display unit, in manners that are different depending on the calculation items.

7. The information processing device according to claim 1, wherein the control unit displays, in an adjacent manner on the display unit, specification information that specifies the calculation items corresponding to the individual evaluation values calculated by the calculation unit and information relevant to the calculation items.

8. An information processing method in which a computer executes a process comprising:

deciding upper limits of respective individual evaluation values for a plurality of calculation items such that a total of the upper limits of the respective individual evaluation values for the calculation items is a previously determined value, the individual evaluation values being relevant to driving of a driver, the calculation items being calculation items for which the individual evaluation values are calculated;

acquiring vehicle information relevant to a vehicle;

calculating the respective individual evaluation values for the calculation items within the decided upper limits of the individual evaluation values, based on the acquired vehicle information; and displaying, on a display unit, the calculated respective individual evaluation values for the calculation items and a total evaluation value that is a total of the respective individual evaluation values for the calculation items.

9. An information processing program that causes a computer to execute a process comprising:

deciding upper limits of respective individual evaluation values for a plurality of calculation items such that a total of the upper limits of the respective individual evaluation values for the calculation items is a previously determined value, the individual evaluation values being relevant to driving of a driver, the calculation items being calculation items for which the individual evaluation values are calculated;

acquiring vehicle information relevant to a vehicle;

calculating the respective individual evaluation values for the calculation items within the decided upper limits of the individual evaluation values, based on the acquired vehicle information; and displaying, on a display unit, the calculated respective individual evaluation values for the calculation items and a total evaluation value that is a total of the respective individual evaluation values for the calculation items.

* * * * *